United States Patent
Brandt et al.

(10) Patent No.: US 10,075,296 B2
(45) Date of Patent: Sep. 11, 2018

(54) LOADING AND VIRTUALIZING CRYPTOGRAPHIC KEYS

(71) Applicant: Intel Corporation, Santa Clara, CA (US)

(72) Inventors: Jason W Brandt, Austin, TX (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 14/791,203

(22) Filed: Jul. 2, 2015

(65) Prior Publication Data
US 2017/0063547 A1   Mar. 2, 2017

(51) Int. Cl.
*H04L 9/08* (2006.01)
*G06F 21/53* (2013.01)
*G06F 9/455* (2018.01)

(52) U.S. Cl.
CPC ........... *H04L 9/0894* (2013.01); *G06F 21/53* (2013.01); *G06F 9/45533* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 9,274,974 B1* | 3/2016 | Chen | G06F 12/109 |
| 2005/0138370 A1* | 6/2005 | Goud | G06F 21/53 |
| | | | 713/164 |
| 2008/0022129 A1* | 1/2008 | Durham | G06F 21/54 |
| | | | 713/189 |
| 2008/0077767 A1* | 3/2008 | Khosravi | G06F 12/1408 |
| | | | 711/216 |
| 2008/0244168 A1* | 10/2008 | Warrier | G06F 12/1433 |
| | | | 711/105 |

(Continued)

FOREIGN PATENT DOCUMENTS

WO   2013/095473 A1   6/2013

OTHER PUBLICATIONS

Arthur et al.; A practical Guide to TPM 2.0; Jan. 2015; Apress Open; Retrieved from the Internet <URL: http://link.springer.com/book/10.1007/978-1-4302-6584-9>; pp. 1-375.*

(Continued)

*Primary Examiner* — Saleh Najjar
*Assistant Examiner* — Michael W Chao
(74) *Attorney, Agent, or Firm* — Nicholson De Vos Webster & Elliott LLP (57) ABSTRACT

Embodiments of an invention for loading and virtualizing cryptographic keys are disclosed. In one embodiment, a processor includes a local key storage location, a backup key storage location, and execution hardware. Neither the local key storage location nor the backup key storage location is readable by software. The execution hardware is to perform a first operation and a second operation. The first operation includes loading a cryptographic key into the local key storage location. The second operation includes copying the cryptographic key from the local key storage location to the backup key storage location.

3 Claims, 4 Drawing Sheets

(56) References Cited

U.S. PATENT DOCUMENTS

| | | | | |
|---|---|---|---|---|
| 2009/0063835 | A1* | 3/2009 | Yao | G06F 12/1491 713/2 |
| 2009/0172328 | A1* | 7/2009 | Sahita | G06F 12/1491 711/163 |
| 2009/0327575 | A1* | 12/2009 | Durham | G06F 12/145 711/6 |
| 2010/0031325 | A1* | 2/2010 | Maigne | G06F 9/45533 726/4 |
| 2010/0082991 | A1 | 4/2010 | Baldwin et al. | |
| 2013/0091318 | A1* | 4/2013 | Bhattacharjee | G06F 12/1475 711/6 |
| 2013/0097392 | A1* | 4/2013 | Arges | G06F 9/468 711/152 |
| 2013/0125119 | A1* | 5/2013 | Vipat | G06F 9/45533 718/1 |
| 2014/0059312 | A1 | 2/2014 | Uno | |
| 2014/0208123 | A1 | 7/2014 | Roth et al. | |
| 2015/0026426 | A1 | 1/2015 | Sahita et al. | |
| 2015/0178497 | A1* | 6/2015 | Lukacs | G06F 9/461 726/23 |
| 2015/0281237 | A1* | 10/2015 | Swanson | H04L 63/10 726/3 |
| 2016/0350534 | A1* | 12/2016 | Poornachandran | G06F 21/57 |
| 2018/0045189 | A1* | 2/2018 | Lee | F04B 33/00 |

OTHER PUBLICATIONS

England et al.; Para-Virtualized TPM Sharing; 2008; Retrieved from the Internet <URL: http://link.springer.com/chapter/10.1007/978-3-540-68979-9_9>; pp. 1-14 as printed.*

Ariel Segall; Using the TPM: Data Protection and Storage; 2012; Retrieved from the Internet <URL: https://web.archive.org/web/20121115044453/http://opensecuritytraining.info/IntroToTrustedComputing_files/Day2-2-data-storage.pdf>; pp. 1-23 as printed.*

Eisenbarth et al.; "Reconfigurable Trusted Computing in Hardware"; 2007; retrieved from the Internet <URL: http://dl.acm.org/citation.cfm?id=1314360 >; pp. 1-6 as printed.*

No stated author; Trusted Platform Module Library Part 3: Commands; 2014; Trusted Computing Group; Retrieved from the Internet <URL: https://trustedcomputinggroup.org/wp-content/uploads/TPM-Rev-2.0-Part-3-Commands-01.16-code.pdf>; pp. 1-33, as printed. (Year: 2014).*

International Search Report and Written Opinion for Application No. PCT/US2016/035195, dated Mar. 13, 2017, 12 pages.

International Preliminary Report on Patentability for Application No. PCT/US2016/035195, dated Jan. 11, 2018, 12 pages.

* cited by examiner

FIGURE 3

LOADING AND VIRTUALIZING CRYPTOGRAPHIC KEYS

BACKGROUND

1. Field

The present disclosure pertains to the field of information processing, and more particularly, to the field of security in information processing systems.

2. Description of Related Art

Private information and other secrets are used by and stored in many information processing systems. Many techniques have been developed to attempt to store and/or transfer secrets such that they cannot be discovered or altered. These techniques often involve the use of one or more cryptographic keys. Therefore, techniques to protect the integrity of these cryptographic keys have been developed, and more are needed as malicious attacks on information processing systems become an increasingly serious threat.

BRIEF DESCRIPTION OF THE FIGURES

The present invention is illustrated by way of example and not limitation in the accompanying figures.

DETAILED DESCRIPTION

Embodiments of an invention for loading and virtualizing cryptographic keys are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, many techniques for using, transferring, and storing private or confidential information involve cryptographic keys. Therefore, the use of embodiments of the present invention may be desired to provide protection for cryptographic keys and mitigate the vulnerability to attack of information processing systems and devices.

Figure 1:
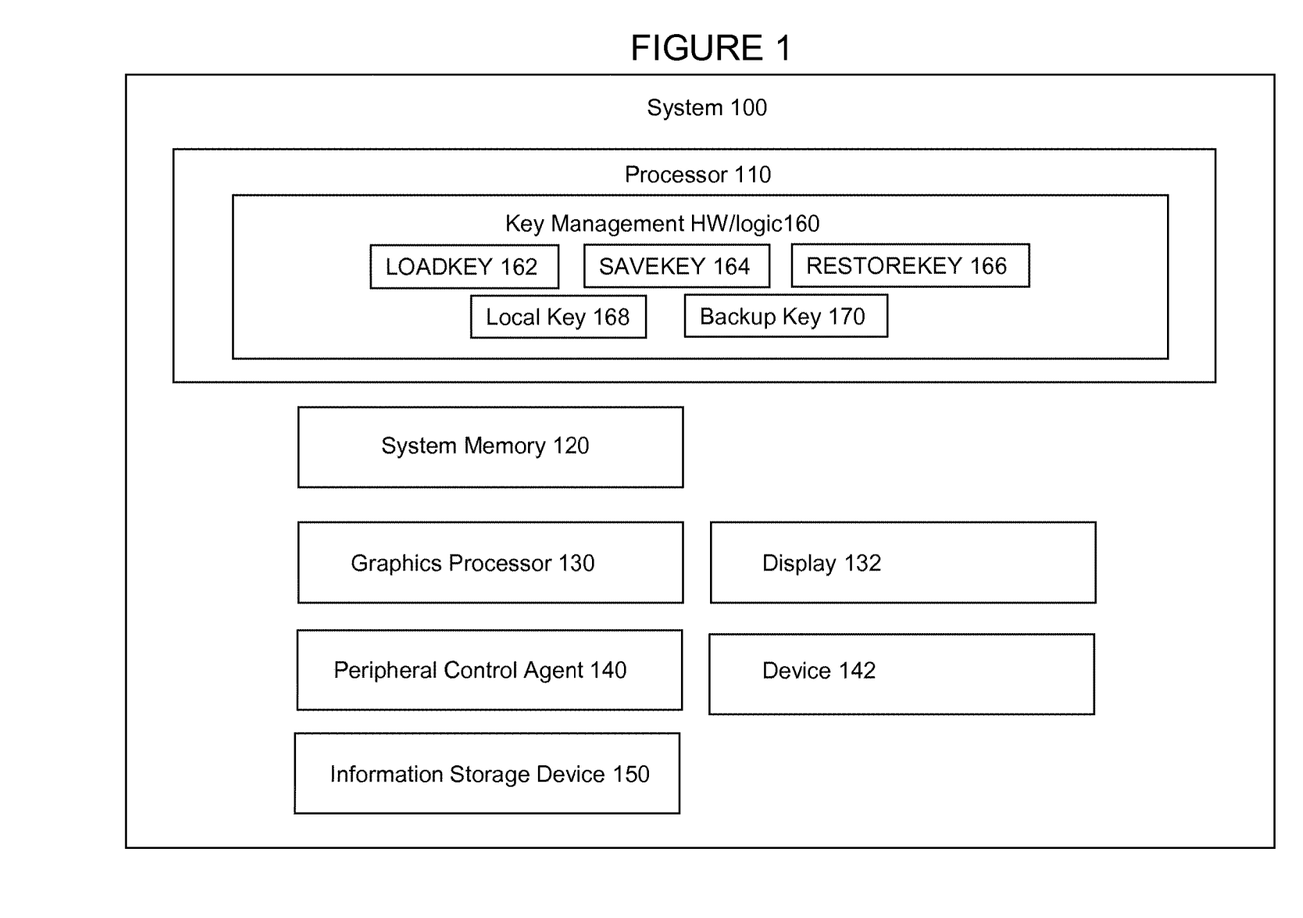
FIG. 1 illustrates a system including support for loading and virtualizing cryptographic keys according to an embodiment of the present invention.

FIG. 1 illustrates system 100, an information processing system including an embodiment of the present invention for loading and virtualizing cryptographic keys. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory (DRAM) or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 110 may be microarchitected and designed to operate according to any instruction set architecture, with or without being controlled by microcode.

Support for loading and virtualizing a cryptographic key according to an embodiment of the present invention may be implemented in a processor, such as processor 110, using any combination of circuitry and/or logic embedded in hardware, microcode, firmware, and/or other structures arranged as described below or according to any other approach, and is represented in FIG. 1 as key management hardware and/or logic 160, which may include load-key hardware/logic 162 to support a LOADKEY operation, save-key hardware/logic 164 to support a SAVEKEY operation, restore-key hardware/logic 166 to support a RESTOREKEY instruction, local key register(s) 168, and backup key register(s) 170, each of which is described below.

Figure 2:
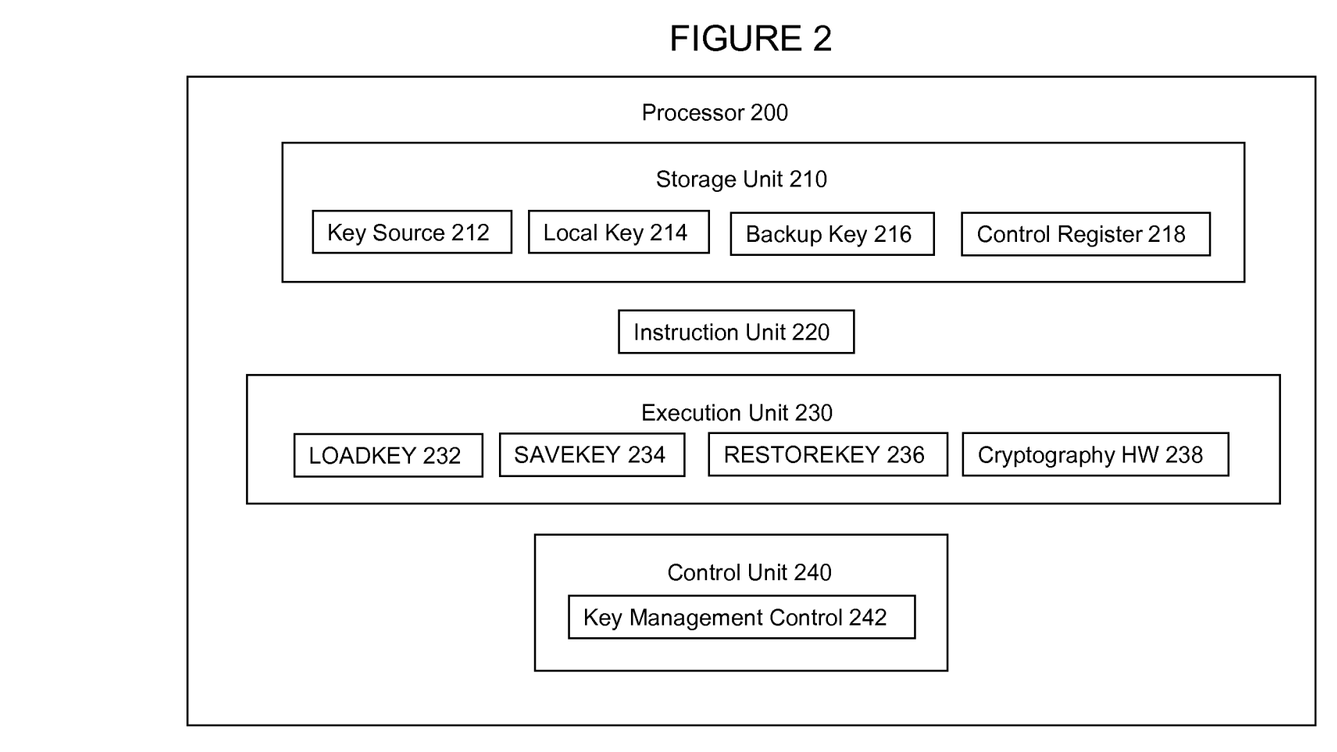
FIG. 2 illustrates a processor including support for loading and virtualizing cryptographic keys according to an embodiment of the present invention.

FIG. 2 illustrates processor 200, which may represent an embodiment of processor 110 in FIG. 1 or an execution core of a multicore processor embodiment of processor 110 in FIG. 1. Processor 200 may include storage unit 210, instruction unit 220, execution unit 230, and control unit 240, where the circuitry, structure, and functionality of key management hardware/logic 160 of FIG. 1 is distributed among each unit of processor 200 as described below. Processor 200 may also include any other circuitry, structures, or logic not shown in FIG. 1.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage and/or to cause or support various operations and/or configurations associated with access to such storage.

Storage unit 210 may include one or more key source registers 212, local key registers 214, and/or backup key registers 216. Key source register 212 may be a data register or other register or storage location of any size, from which a cryptographic key, a value to be used as a cryptographic key, a value from which a cryptographic key may be derived, or a portion of such a key or value may be loaded in a LOADKEY operation. Note that although key source register(s) 212 may be readable by software, its content in connection with a LOADKEY operation may be protected by one or more known security techniques (e.g., by loading the content into it, performing the LOADKEY operation, then clearing it, all by or within a secure boot process, an authenticated code module, a secure or trusted execution environment, etc.).

Local key register 214 may be a register or other storage location of any size, into which a cryptographic key or a value to be used as a cryptographic key may be loaded in a LOADKEY operation. Local key register 214 may be protected by hardware such that its content may not be discovered or revealed. For example, access to local key register 214 may be limited such that its content may be used by hardware within processor 200 (e.g., used as a wrapping or other key by cryptographic hardware), but copied or moved only in connection with a SAVEKEY operation, according to embodiments of the present invention as described below, or in connection with other techniques that provide for its limited accessibility to be maintained (e.g., by a cryptographic security engine, other privileged hardware agent or entity, or firmware or software within a secure or trusted execution environment). In other words, local key register 214 is inaccessible through the use of a read instruction or any other instruction with which software could make its content openly readable outside of processor 200.

Backup key register 216 may be a register or other storage location of any size, in which a cryptographic key or a value to be used as a cryptographic key may be stored. In an embodiment of the present invention, the content of backup key register 216 may persist or be retained across power cycles, for example, during standby, sleep, suspend, hibernate, and/or other power management states. For example, backup key register 216 may receive power from one or more pins or other electrical connectors on the package of processor 200 when other circuitry in processor 200, such as local key register 214, may be powered down. Alternatively, backup key register 216 may be implemented in non-volatile (e.g., flash) memory or storage on the same die or in the same package as processor 200. Alternatively, backup key register 216 may be implemented in volatile memory or storage on the same die or in the same package as processor 200, but with a secure backup mechanism that allows its content to be securely (e.g., using encryption, authentication, integrity checking, and/or replay protection techniques) moved or copied to other storage that is non-volatile or powered at times when processor 200 or portions of processor 200 may be powered down. Various other embodiments may be possible within the scope of the present invention. Note that the use of any such technique to retain the content of backup key register 216 across power cycles need not be dedicated to backup key register 216; in other words, other information and/or processor state may also be retained using the same technique for the same purpose.

Backup key register 216 may be protected by hardware such that its content may not be discovered or revealed. For example, access to backup key register 216 may be limited such that its content may be copied or moved only in connection with a RESTOREKEY operation, according to embodiments of the present invention as described below, or in connection with other techniques that provide for its limited accessibility to be maintained (e.g., by a cryptographic security engine, other privileged hardware agent or entity, or firmware or software within a secure or trusted execution environment). In other words, backup key register 216 is inaccessible through the use of a read instruction or any other instruction with which software could make its content openly readable outside of processor 200.

Storage unit 210 may also include control register 218, which may represent one or more registers, other storage locations, or portions of registers or storage locations into which control and/or configuration information may be programmed. Control register 218 may represent one or more control registers specified or defined according to an existing processor or instruction set architecture, one or more new control registers added to an existing processor or instruction set architecture, or one or more bits/fields in an existing or new register. In various embodiments, control register 218 may include one or more bits to enable one or more features of the present invention. For example, control register 218 may include a LOADKEY_ENABLE bit, a SAVEKEY_ENABLE bit, and/or a RESTOREKEY enable bit, each of which may be set to enable the use of a LOADKEY operation, a SAVEKEY operation, and/or a RESTOREKEY operation, respectively, and/or a combined enable bit which may be set to enable the use of two or more operations, where the attempted use of such an operation when the corresponding enable bit is not set causes an exception.

In various embodiments, control register 218, a different control register, or a virtual machine control structure (VMCS) may include bits or fields to enable a SAVEKEY operation to occur automatically in connection with a virtual machine (VM) exit and/or enable the RESTOREKEY operation to occur automatically in connection with a VM entry, as further described below.

Instruction unit 220 may include any circuitry, logic, structures, and/or other hardware, such as an instruction decoder, to fetch, receive, decode, interpret, schedule, and/or handle instructions to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach.

In an embodiment, instruction unit 220 may receive a LOADKEY instruction, a SAVEKEY instruction, and/or a RESTOREKEY instruction, the execution of which by processor 200 is described below. Note that the names of these instructions are provided merely for convenience, and embodiments of the present invention may include such instructions having any names desired. In various embodiments, the LOADKEY, SAVEKEY, and RESTOREKEY instructions may be different instructions received by instruction unit 230, they may be leaves of the same instruction, or they may be the same instruction with different operands. Note that various embodiments of the present invention are described and more may be possible, including various differences in the parameters of each instruction and the response of a processor to each instruction. Note also that the processor's execution of and/or response to these instructions, as described below, may also or instead be performed (and referred to below as a LOADKEY, SAVEKEY, or RESTOREKEY operation) in response to or in connection with other events (e.g., a write to or setting (by software, firmware, or hardware) of bits of a command, model-specific, or other register; a VM entry or exit (whether triggered by an instruction, interrupt, exception, or other event; etc.), some of which may be described below. Embodiments of the present invention may include any one or more of these variations.

In an embodiment, a LOADKEY instruction may include one or more source operands to specify a source of a cryptographic key or other value to be used as a cryptographic key or from which a cryptographic key may be derived. Various embodiments may provide for any set or subset of registers of a processor to be used as the source by causing an exception if a source operand does not specify a valid source. In the embodiment of FIG. 2, key source register 212 is shown for convenience, and may be one of any number of valid source registers.

In other embodiments, a cryptographic key (or other value to be used as a cryptographic key or from which a cryptographic key may be derived) to be loaded in connection with a LOADKEY operation (as described below) may be provided by another source (e.g., a random number generator, fuse array, physically uncloneable function, etc.), in which case a LOADKEY instruction may be used without a source operand or have a format that does not include a source operand field. Note that embodiments of the present invention may provide for a processor to use a default key source (e.g., hardware) that may be overridden (e.g., by software) using a LOADKEY instruction.

In an embodiment, instruction unit 220 may also or instead receive one or more instructions to access one or more registers, such as local key register 214 and/or backup key register 216, where the access to the register may cause data to be moved in or out of the register, from or to another register, such as key source register 212, local key register 214, and/or backup key register 216, without the content of either register being accessible to software. Such an instruction may be an instruction in the instruction set architecture of a processor that may be used to access one or more other registers or other storage locations. For example, such an instruction may be a read, write, or move instruction having one or more operands to specify a register or other storage location to be read, written, or in or out of which to have content moved or copied. When such an operand specifies a register other than local key register 214 or backup key register 216, the content of such a register may be accessed by the software issuing the instruction. However, when such an operand specifies local key register 214 or backup key register 216, hardware in execution unit 230 may provide for content to be moved between key source register 212, local key register 214, and/or backup key register 216 without the content being readable or otherwise observable (during or in connection with the LOADKEY, SAVEKEY, and/or RESTOREKEY operation) by the software issuing the instruction or by any other software.

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units. Execution unit 230 may include load-key hardware 232 to execute a LOADKEY instruction/operation, save-key hardware 234 to execute a SAVEKEY instruction/operation, and restore-key hardware 236 to execute a RESTOREKEY instruction/operation, each as further described below. Although shown as separate elements in FIG. 2, load-key hardware 232, save-key hardware 234, and restore-key hardware 236 may include circuitry that is also used to execute other instructions and/or operations.

Execution unit 230 may also include cryptographic hardware 238 to implement any one or more cryptographic algorithms. In an embodiment, local key register 214 may be hardwired or otherwise connected to cryptographic hardware 238 such that the content of local key register 214 may be used as a cryptographic key in such an algorithm, without exposing the content of local key register 214 to software.

In an embodiment, load-key hardware 232 may, in response to a LOADKEY instruction, perform a LOADKEY operation, where a LOADKEY operation includes loading, moving, or copying a key value into a private, internal storage location in processor 200, from which hardware in processor 200 may access content for use as a cryptographic or other key in any special purpose cryptographic hardware or general purpose hardware with which a cryptographic or other key-based algorithm may be performed, but from which software cannot read content. For example, in response to a LOADKEY instruction, load-key hardware 232 may load the content of the source register into local key register 214 for use by cryptographic hardware 236.

Various embodiments of a load-key operation are possible within the scope of the present invention. In various embodiments, the key value may be a wrapping key, a session key, any other type of key, or any value from which any such key may be derived. In an embodiment, the key value may be loaded from a register or registers specified by a source operand or operands of a LOADKEY instruction. In other embodiments, the key value may be any other software-specified value; for example, a value from another storage location within the processor or from a specified location in a system memory. In other embodiments, the key value may be provided by a random number generator, a fuse array, a physically uncloneable function, or some other source. Embodiments of the present invention may provide for a processor to use a default key source (e.g., hardware) that may be overridden (e.g., by software) in a LOADKEY operation.

In an embodiment, load-key hardware 232 may also or instead perform a LOADKEY operation in response to any LOADKEY command, where a LOADKEY command may include one or more register access instructions as described above, such as a write to local key register 214, or any other instruction or command specified by the processor or instruction set architecture to be used to cause a LOADKEY operation.

In an embodiment, save-key hardware 234 may, in response to a SAVEKEY instruction, perform a SAVEKEY operation, where a SAVEKEY operation includes moving or copying the content of core-scoped or logical-processor-scoped key storage to package-scoped key storage. For example, in response to a SAVEKEY instruction, save-key hardware 234 may move/copy the content of local key register 214 to backup key register 216.

In an embodiment, save-key hardware 234 may also or instead perform a SAVEKEY operation in response to any SAVEKEY command, where a SAVEKEY command may include one or more register access instructions as described above, such as a write to backup key register 216, or any other instruction or command specified by the processor or instruction set architecture to be used to cause a SAVEKEY operation.

In an embodiment, restore-key hardware 236 may, in response to a RESTOREKEY instruction, perform a RESTOREKEY operation, where a RESTOREKEY operation includes moving or copying the content of package-scoped key storage to core-scoped or logical-processor-scoped key storage to package-scoped key storage. For example, in response to a RESTOREKEY instruction, restore-key hardware 236 may move/copy the content of backup key register 216 to local key register 214.

In an embodiment, restore-key hardware 236 may also or instead perform a RESTOREKEY operation in response to any RESTOREKEY command, where a RESTOREKEY command may include one or more register access instructions as described above, such as a read from backup key register 216, or any other instruction or command specified by the processor or instruction set architecture to be used to cause a RESTOREKEY operation.

In various embodiments, save-key and restore-key commands and operations may be associated with instructions in different ways. For example, a single execution of a first instruction may cause only a save-key command and operation, and a single execution of a second instruction may cause only a restore-key command and operation. Alternatively, a single execution of a third instruction may cause a save-key command and operation along with other commands and/or operations, such as the saving of other elements of processor state, and a single execution of a fourth instruction may cause a restore-key command and operation along with other commands and/or operations, such as the restoring of other elements of processor state. Various embodiments may include any number and variety of instructions and instruction formats that may result in save-key and restore-key commands and operations in isolation or in connection with any number of other commands and/or operations.

Save-key hardware 234 and restore-key hardware 236 may perform save-key and restore-key operations in response to save-key and restore-key commands such that the data being moved/copied between local key register 214 and backup key register 216 cannot be read by software.

Control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information stored in storage unit 210, where such control and/or configuration information may be stored in or programmed into control/configuration registers such as control register 218.

In an embodiment, control unit 240 may include key management control hardware/logic 242 to control load-key hardware 232, save-key hardware 234, restore-key hardware 236, any other hardware in processor 200 that supports key management techniques of embodiments of the present invention.

In an embodiment, key management control hardware/logic 242 may cause or be configurable to cause a virtual machine exit in response to an attempt to execute a LOADKEY instruction in a virtual machine (VM). Therefore, a virtual machine monitor (VMM) may intercept a LOADKEY instruction in order to manage the use of cryptographic keys by guest software.

For example, a guest running in a VM on a core or logical processor may attempt to use a LOADKEY instruction to load a second cryptographic key into the local key register corresponding to the core or logical processor (where a first cryptographic key has been reserved for use by the VMM; for example, see the description of FIG. 4 below). In response, key management control hardware/logic 242 may cause a VM exit, allowing a VMM to intercept the LOADKEY instruction. The VMM may then copy the second cryptographic key from the source register, load it into the local key register (using its own LOADKEY instruction or through a VM entry that includes loading the second cryptographic key into the local key register from guest state stored in a VMCS), and subsequently use it as described below (e.g., context switches, migrations, etc.).

This approach may be desired for any of several reasons. In an embodiment, it may provide for using separate keys for a guest and a host (e.g., the second key for use by the guest and the first key for use by the host key), and/or separate keys for each guest. In an embodiment, it may facilitate context switches in which a VMM moves guests from core to core or logical processor to logical processor, because it provides for each guest to have its own key that is not specific to any particular core or logical processor and which the VMM may move from core to core or logical processor or logical processor. In an embodiment, it may provide for migration of guests between VMMs; for example, a first VMM may load a guest-specific key into a local key register for a guest, then, that same guest-specific key may be provided (e.g., in a VMCS) to a second VMM to which the guest is migrated.

Other usages of embodiments of the present invention are possible. For example, a VMM may intercept a guest's LOADKEY instruction (e.g., to load the second key into the local key register for use within the VM), then load or cause to be loaded a third key into the local key register for use within the VM (instead of the second key).

Figure 3:
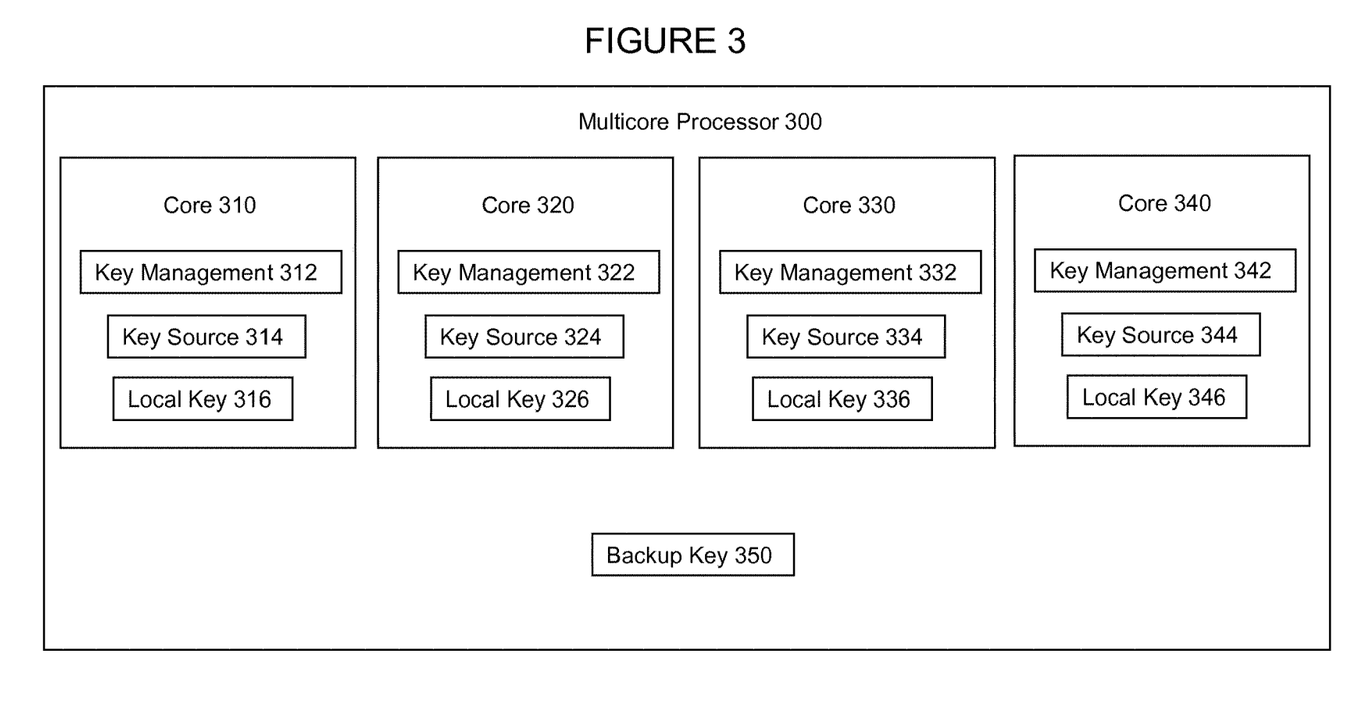
FIG. 3 illustrates a multicore processor including support for loading and virtualizing cryptographic keys according to an embodiment of the present invention.

Although FIG. 2 shows a single instance of each of various hardware elements associated with embodiments of the present invention, various embodiments may include any number of such elements. For example, FIG. 3 illustrates an embodiment of the present invention in multicore processor 300. Multicore processor 300 may include any number of execution cores, each having its own storage unit, instruction unit, execution unit, control unit, and/or any other units, and/or any circuitry, structures, logic, and/or hardware of any such units, such as a second level cache, may be shared in an "uncore" area of multicore processor 300.

Multicore processor 300 includes core 310, core 320, core 330, and core 340, each of which may include a key management unit 312, 322, 332, and 342 respectively, a key source register 314, 324, 334, and 344, respectively, and a local key register 316, 326, 336, and 346, respectively. Each of key management units 312, 322, 332, and 342 may represent and/or include the hardware and/or control logic described above to support key management techniques of embodiments of the present invention.

Multicore processor 300 may also include one or more backup key registers 350, which may be powered by a separate power plane from any or all of cores 310, 320, 330, and/or 340 (such that power may be removed from any or all of cores 310, 320, 330, and/or 340 without removing power from backup key register(s) 350), or which may be non-volatile, or which may have its content securely copied and stored elsewhere. Therefore, embodiments of the present invention provide for maintaining the value of a local cryptographic key through various power management cycles and/or states in which power may be removed from one or more processor cores. For example, system software, such as an operating system, may use a save-key command to save the content of any of local key registers 316, 326, 336, and/or 346 in backup key register(s) 350 in connection with entry into a power management state in which power is removed from a core. Then, in connection with restoring power to the core, system software may use a restore-key command to restore the content from backup key register(s) 350 to any of local key registers 316, 326, 336, and/or 346. In an embodiment, backup key register(s) 350 may be cleared by a reset.

Furthermore, the use of SAVEKEY and RESTOREKEY operations according to embodiments of the present invention may provide for one or more keys to be moved and/or shared among one or more of cores 310, 320, 330, and or 340, through backup key register(s) 350, without being copied to DRAM or system memory.

The use of key management hardware according to various embodiments of the present invention may be desired to provide various techniques for cryptography key management according to various method embodiments of the present invention.

An embodiment may include the use of a cryptographic key by software without allowing the software to read the key. For example, host or system software may use a LOADKEY command to load a key into a core's local key register for use by guest or application software running on that core.

An embodiment may include the generation or modification of a cryptographic key by software to provide for customized key generation. For example, software may use any desired approach to key generation, alone or in connection with any root key, key generation instructions, and/or random number generation support provided by hardware, to generate a custom key or modify (e.g., add randomness to) a hardware or hardware-generated key, then use a LOADKEY command to load the custom key into a local key register.

An embodiment may include the migration of a cryptographic key from one execution core, logical processor, or hardware thread to a different execution core, logical processor, or hardware thread. For example, a VMM may use a save-key command to save a guest's key in connection with the VM exit of a guest running on a first core, then use a restore-key command to restore that same key to a different core before restarting the guest on that other core. Embodiments of the present invention provide for such context switches to be performed without allowing the VMM to read the key.

An embodiment may include the use and management of separate guest-specific keys and a separate host key. For example, FIG. 4 illustrates method 400 for loading and virtualizing cryptographic keys. Although method embodiments of the invention are not limited in this respect, reference may be made to elements of FIGS. 1, 2, and 3 to help describe the method embodiment of FIG. 4. Various portions of method 400 may be performed by hardware, firmware, software, and/or a user of a system or device.

In box 410 of method 400, an information processing system is booted. In box 412, trusted system firmware such as a secure basic input/output system (BIOS) may cause, during a secure boot process, a first cryptographic key to be loaded into a local key storage location of a processor core. The first cryptographic key may copied directly from or derived from (e.g., using dedicated key generation or transformation instructions of the processor) a hardware, real, or root key programmed or embedded in the processor using fuses, metal tie-ups or tie-downs, or any register transfer language technique, or from a key provided by a trusted platform module. Generation, derivation, or transformation of the first key may include the injection of randomness using a hardware random number generator, physically unclonable function, or other obfuscation technique. The local key storage location may be accessible by cryptographic hardware of the processor, but is not readable by software.

In box 420, control of the processor core may be transferred to a VMM. In box 422, the VMM may execute instructions on the processor core, including using the first key as a host key to encrypt and/or decrypt host-specific information. In box 424, the VMM may use a SAVEKEY command to copy the first key from the local key storage location to a backup key storage location in the uncore of the processor, without being able to read the value of the key. In box 426, in preparation for a VM entry, the VMM may clear or replace the content of the local key storage location to prevent the use of the first key by a guest. In box 428, the VMM may start or resume execution of a guest in a VM on the processor core. Note that box 426 may be performed automatically in connection with box 428.

In box 430, the guest may perform one or more key generation, transformation, or derivation instructions or operations to generate a second cryptographic key in a key source register. In box 432, the guest may attempt a LOAD-KEY instruction to load a second key from the key source register into the local key storage location for use to encrypt and/or decrypt guest-specific information. In box 434, the LOADKEY attempt may cause a VM exit to the VMM.

In box 440, the VMM may read the value of the second key from the key source register designated by the source operand of the attempted LOADKEY instruction. In box 442, the VMM may store the value of the second key in a guest-key field of a VMCS or other memory location (which may be protected by any known technique, such as but not limited to access control mechanisms including the use of extended or nested page tables) for use as a guest-specific key. In box 444, the VMM may load the guest-specific key from the key source register to the local key storage location using LOADKEY instruction. In box 446, the VMM may resume execution of the guest in the VM. Note that box 446 may include automatically loading the guest-specific key from the guest-key field of the VMCS, in which case box 444 may be omitted. In box 448, the guest may execute in the VM, including using the guest-specific key from the local key storage location to encrypt and/or decrypt information, without being able to read the value of the key.

In box 450, a first power management event may occur, as a result of which the system is to enter a power management state in which power is to be removed from the processor core supporting the VM in which the guest is executing. In box 452, the first power management event causes a VM exit to the VMM. In box 454, power is removed from the processor core (but not to the backup key storage location or the memory in which the VMCS or guest-specific key is stored).

In box 460, a second power management event may occur, as a result of which power is to be returned to the processor core. In box 462, power is returned to the processor core. In box 464, the VMM resumes execution on the processor core. In box 466, the VMM uses a restore-key command to copy the host key from the backup key storage location to the local key storage location, without being able to read the value of the key. In box 468, the VMM may execute instructions on the processor core, including using the host key to encrypt and/or decrypt host-specific information.

In box 470, in preparation for a VM entry, the VMM may copy the value of the guest-specific key from its memory location to a key source register. In box 472, the VMM may load the guest-specific key from the key source register into the local key storage location using a LOADKEY instruction. In box 474, the VMM may resume execution of the guest in the VM. Note that box 474 may include automatically loading the guest-specific key from the guest-key field of the VMCS, in which case boxes 470 and 472 may be omitted. In box 476, the guest may execute in the VM, including using the guest-specific key from the local key storage location to encrypt and/or decrypt information, without being able to read the value of the key.

Figure 4:
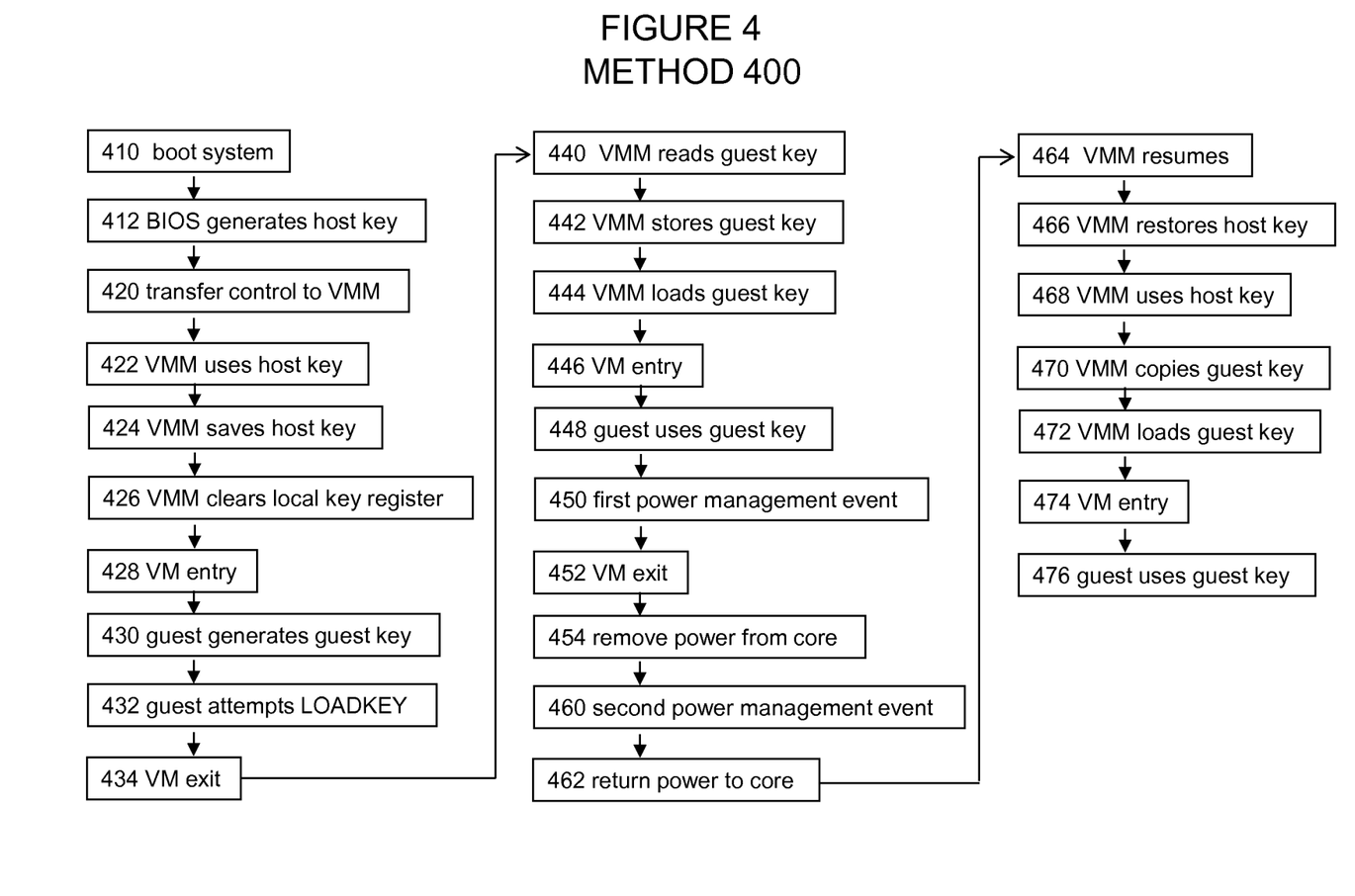
FIG. 4 illustrates a method for loading and virtualizing cryptographic keys according to embodiments of the present invention.

In various embodiments of the present invention, the method illustrated in FIG. 4 may be performed in a different order, with illustrated boxes combined or omitted, with additional boxes added, or with a combination of reordered, combined, omitted, or additional boxes. Furthermore, method embodiments of the present invention are not limited to method 400 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for loading and virtualizing cryptographic keys attacks have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
   a memory; and
   a processor including
   a register;
   a local key storage location not readable outside of the processor;
   a backup key storage location not readable outside of the processor;
   instruction hardware to receive a first instruction, a second instruction, and a third instruction, the first instruction having an operand to specify the register as a source;
   execution hardware to perform a first operation in response to the first instruction, a second operation in response to the second instruction, and a third operation in response to the third instruction, the first operation including loading a cryptographic key from the register into the local key storage location, the second operation including copying the cryptographic key from the local key storage location to the backup key storage location, and the third operation including copying the cryptographic key from the backup key storage location to the local key storage location;
   control logic to cause a virtual machine exit in response to an attempt to execute the first instruction in a virtual machine; and
   a virtual machine monitor to respond to the virtual machine exit by copying the cryptographic key from the register to the memory;

the virtual machine monitor to protect the memory using an access control mechanism including one of an extended page table and a nested page table;

wherein a processor state maintains the content of the backup key storage location while the local key storage location is unpowered.

2. The system of claim 1, wherein the copying the cryptographic key from the register to the memory includes storing the cryptographic key in a guest key field in a virtual machine control structure.

3. The system of claim 2, wherein, in connection with a virtual machine entry, the cryptographic key is to be copied from the guest key field in the virtual machine control structure to the local key storage location.

* * * * *